(12) United States Patent
Nogueras et al.

(10) Patent No.: US 9,208,003 B2
(45) Date of Patent: Dec. 8, 2015

(54) HYPERVISOR TO I/O STACK CONDUIT IN VIRTUAL REAL MEMORY

(75) Inventors: Jorge R. Nogueras, Austin, TX (US);
Morgan J. Rosas, Cedar Park, TX (US);
James Y. Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1286 days.

(21) Appl. No.: 12/135,999

(22) Filed: Jun. 9, 2008

(65) Prior Publication Data

US 2009/0307396 A1    Dec. 10, 2009

(51) Int. Cl.
*G06F 13/12* (2006.01)
*G06F 13/38* (2006.01)
*G06F 9/54* (2006.01)

(52) U.S. Cl.
CPC ............. *G06F 9/545* (2013.01); *G06F 9/541* (2013.01)

(58) Field of Classification Search
USPC .......................................................... 710/65
See application file for complete search history.

(56) References Cited

U.S. PATENT DOCUMENTS

| | | | |
|---|---|---|---|
| 6,732,104 B1 * | 5/2004 | Weber ................................. 1/1 | |
| 2005/0240932 A1 | 10/2005 | Billau et al. | |
| 2005/0256859 A1 | 11/2005 | Keohane et al. | |
| 2007/0011272 A1 | 1/2007 | Bakke et al. | |
| 2007/0106992 A1 | 5/2007 | Kitamura | |
| 2007/0233775 A1 | 10/2007 | Jackson et al. | |
| 2008/0104591 A1 | 5/2008 | McCrory et al. | |
| 2009/0089464 A1 * | 4/2009 | Lach et al. ........................ 710/62 |
| 2009/0276785 A1 * | 11/2009 | Ali et al. ........................ 718/104 |

* cited by examiner

*Primary Examiner* — Chun-Kuan Lee
(74) *Attorney, Agent, or Firm* — Damion Josephs; Gregory K. Goshorn; Greg Goshorn, P.C.

(57) ABSTRACT

Provided is conduit configured such that a hypervisor does not need to include logic for communicating directly with an I/O storage device. A virtual Asynchronous Service Interface (VASI) is the interface between a Command/Response Queue (CRQ), which receives CRQ commands from the hypervisor, and a Common Data-Link Interface (CDLI) of a Forwarder. The Forwarder receives I/O commands in a format associated with the CDLI and converts the commands into a generic I/O format understood by a Virtual Block Storage Device (VBSD). The reformatted command is transmitted to the VBSD, which issues commands to the native I/O stack. The hypervisor sends a read or write (R/W) request to the VASI, which passes the request to the Forwarder. The Forwarder converts the request and transmits the converted request to the VBSD. The VBSD transmits the request to the block storage device and returns the response to the Forwarder. The Forwarder replies to the request from the VASI with the response from the ABSD. The VASI then responds to the hypervisor. Also provided is an operation-specific module responsible for understanding and the intelligent processing of data that is transmitted between the hypervisor and the I/O stack.

23 Claims, 6 Drawing Sheets

HYPERVISOR TO I/O STACK CONDUIT IN VIRTUAL REAL MEMORY

BACKGROUND

1. Technical Field

The claimed subject matter relates to a method for simplify processing associated with Input/Output (I/O) associated with a hypervisor in a computing system.

2. Description of the Related Art

International Business Machines Corp. (IBM) of Armonk, N.Y. has been at the forefront of new paradigms in business computing. During the 1960's, IBM invented the concept of a hypervisor. A hypervisor is software running on a particular hardware platform that enables multiple operating systems (OSs) to run on the platform at the same time. Typically, this feature is accomplished by "virtualizing," or hiding technical details, of a computer resource from users of that resource. Virtualization may create the appearance to end users or other resources that a single computer resource functions as multiple virtual resources or that multiple physical resources appear as a single virtual resource.

During the 1990's, IBM developed the concept of logical partitions, or "LPARs." While the hypervisor is directed to the virtualization of operating systems, LPAR focuses on the partitioning of computer hardware resources. For example, a physical machine can be partitioned into multiple LPARs, each hosting a separate operating system. In data storage systems, LPARs enable multiple virtual instances of a storage array to exist within a single physical array. Further virtualization of computer memory has lead to virtual real memory (VRM). With the advent of VRM, data servers may create LPARs that are over-subscribed in terms of real memory usage. In other words, if a server has 32 GBs of real memory, LPARs may be created that use 40 GB of VRM. To perform this, a hypervisor running on the server executes page-in and page-out requests to disk on behalf of the LPARs, much like virtual memory managers (VMMs) currently do within an OS. Memory paged-out is written to physical disk storage handled by a virtual I/O server (VIOS), which is a special purpose LPAR that provides other client LPARs with virtualized I/O resources.

Input/Out (I/O) request are typically handled by one or more device drivers, or a "conduit," that act in tandem to deliver a command for the hypervisor to an I/O stack. The conduit receives a request from the hypervisor to access a specific portion of memory for I/O, such as a block storage device. The conduit translates the request into a command that is understandable to the block storage device and transmits the request to the storage device. The block storage device processes the request and transmits a response to the conduit, which forwards the response to the hypervisor.

Currently available conduits handle specialized processing based upon the data types associated with either the hypervisor or the I/O block storage device. Adding functionality to the conduit related to data content rather than merely data transfer requires the creation of a new type of conduit.

SUMMARY OF THE CLAIMED SUBJECT MATTER

Provided is novel conduit configured such that the hypervisor does not need to include logic for communicating directly with an I/O storage device. The novel conduit includes three devices, a virtual Asynchronous Service Interface (VASI), a "Forwarder" and a Virtual Block Storage Device (VBSD). The VASI is the interface between a Command/Response Queue (CRQ), which receives CRQ commands from the hypervisor, and a Common Data-Link Interface (CDLI) of the Forwarder. The Forwarder receives I/O commands in a format associated with the CDLI and converts the commands into a generic I/O format understood by the VBSD. The reformatted command is transmitted to the VBSD, which issues commands to the native I/O stack.

The hypervisor sends a read or write (R/W) request to the VASI, which passes the request to the Forwarder. The Forwarder receives the request, converts the request into a form readable by the VBSD and transmits the converted request to the VBSD. The VBSD transmits the request to the block storage device and returns the response to the Forwarder. The Forwarder then replies to the request from the VASI with the response from the ABSD. The VASI then responds to the hypervisor.

Also provided is an operation-specific module responsible for understanding and intelligent processing of data that is transmitted between the hypervisor and the I/O stack. The module understands a state diagram of a particular operation and configures any ancillary devices that may be necessary for successful completion of the operation. The module also initiates and processes state changes required for the operation, implement any processing algorithms necessary for the operation, converts data into a format readable by both the hypervisor and the I/O stack and performs any additional manipulations pertinent to the operation.

For example, if the operation is a memory paging operation, in which case the operation-specific module is referred to as a "Pager," the module includes specialized algorithms for caching, read-ahead, I/O coalescing, as well as logic to dynamically configure block storage devices to be used as paging devices if necessary. A Pager would also include logic for processing state changes necessary for the paging of memory, e.g. to support redundant paging devices.

One advantage of the disclosed technology is that the hypervisor does not need to include logic to directly communicate with the I/O storage device. This allows for changes in both CRQ commands and the I/O stack interface to have minimal or no impact on the conduit. In addition, changes to CRQ commands have no impact on the I/O stack and changes to the I/O block storage device have no impact on the hypervisor.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Although described with particular reference to data storage, the claimed subject matter can be implemented in any information technology (IT) system in which functional modularity is desirable. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for modularizing computer functionality. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
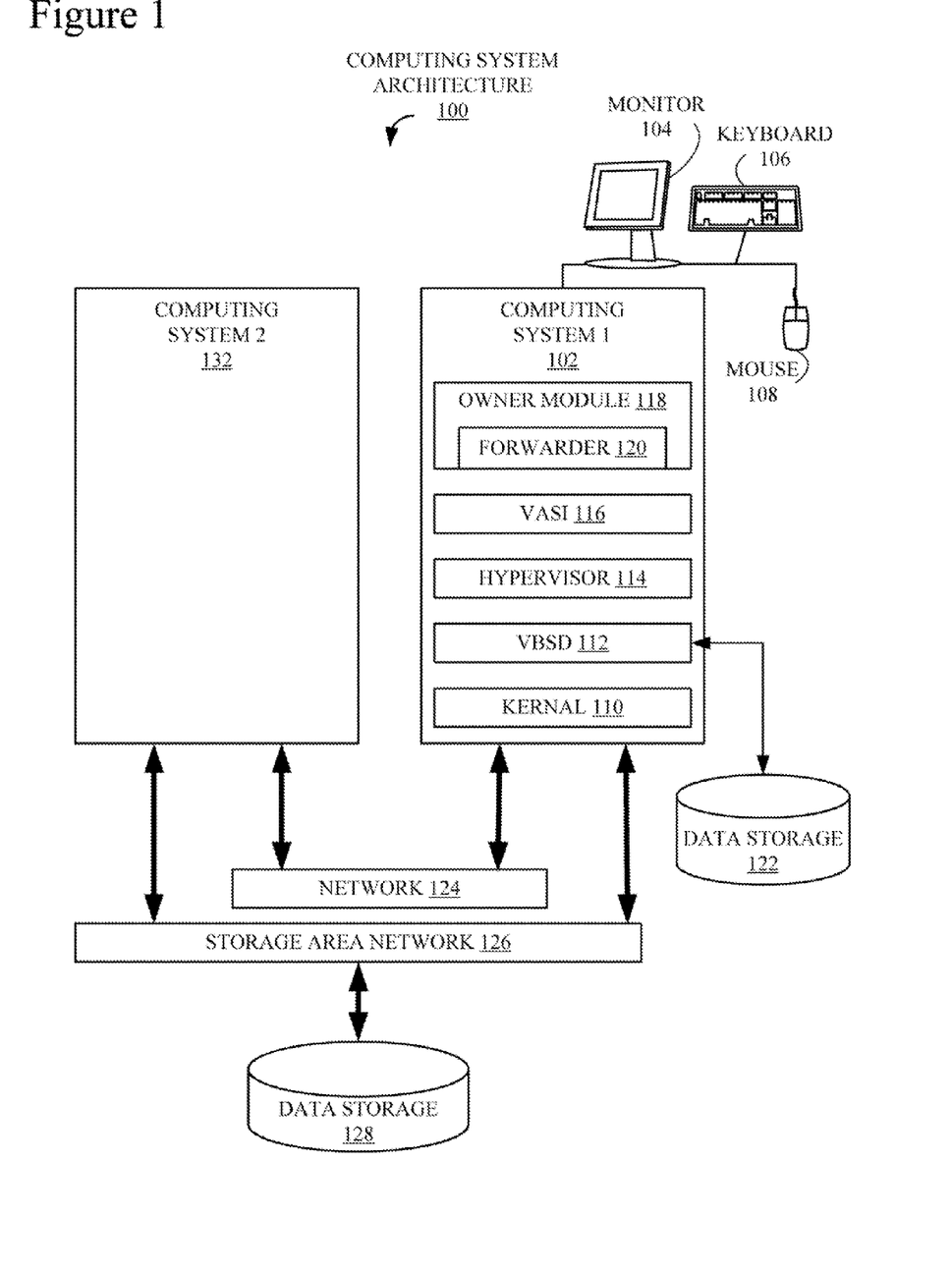
FIG. 1 is one example of a computing architecture the supports the claimed subject matter.

FIG. 1 is one example of a computing architecture 100 the supports the claimed subject matter. Architecture 100 includes two computing systems, a computing system 1 102 and a computing system 2 132. Systems 102 and 132 are communicatively coupled via a network 124. Systems 102 and 132 are also coupled to a storage area network (SAN) 126 that provides both systems 102 and 132 a connection to a shared data storage 128. Systems 102 and 132 could also be coupled through any number of communication mediums such as, but not limited to, a wide area network (WAN) (not shown) and direct connections. Systems 102 and 132 may be the same of different types of computing systems and, in fact, the disclosed technology facilitates multiple types of systems to access common resources such as data storage 128. In the following example, the claimed subject matter is described with respect to an operation specific, or owner, module 118 that accesses data storage 122. Of course, it should be understood that the task of data storage and retrieval is only one example of resource utilization and that there are many possible computing system configurations, of which computing system architecture 100 is only one simple example, applicable to the claimed subject matter.

System 102 includes a monitor 104, a keyboard 106 and a mouse 108, which together facilitate human interaction with system 102. System 102 also includes data storage 122. Although not illustrated, system 132 includes at least one each of a monitor, keyboard, mouse and data storage like 104, 106, 108 and 122. In addition, systems 102 and 132 also include, but are not shown for the sake of simplicity, the components typically found in computing systems such as, but not limited to a power supply, data busses, one or more central processing units (CPUs), multiple data storage devices and so on.

In this example, computing system 1 102 includes owner module 118, a kernel 110, a virtual block storage device (VBSD) 112, a hypervisor 114 and a virtual asynchronous services interface (VASI) 116. Owner module 118 includes a novel component that implements the claimed subject matter, i.e. a forwarder module, or Forwarder, 120. Forwarder 120 is described in more detail below in conjunction with FIG. 3.

Throughout the Specification a specific example of an owner module, or a "Pager," is employed to describe the claimed subject matter. A Pager is an owner-specific module that handles I/O requests. It should be understood that, although the claimed subject matter is described at time with respect to an owner-specific module and at time with respect to a "Pager," there are many owner-specific operations and modules that would benefit from the disclosed technology. The coordination and execution of components 110, 112, 114, 116, 118 and 120 to implement the claimed subject matter are described in more detail below in conjunction with FIGS. 2-6.

Figure 2:
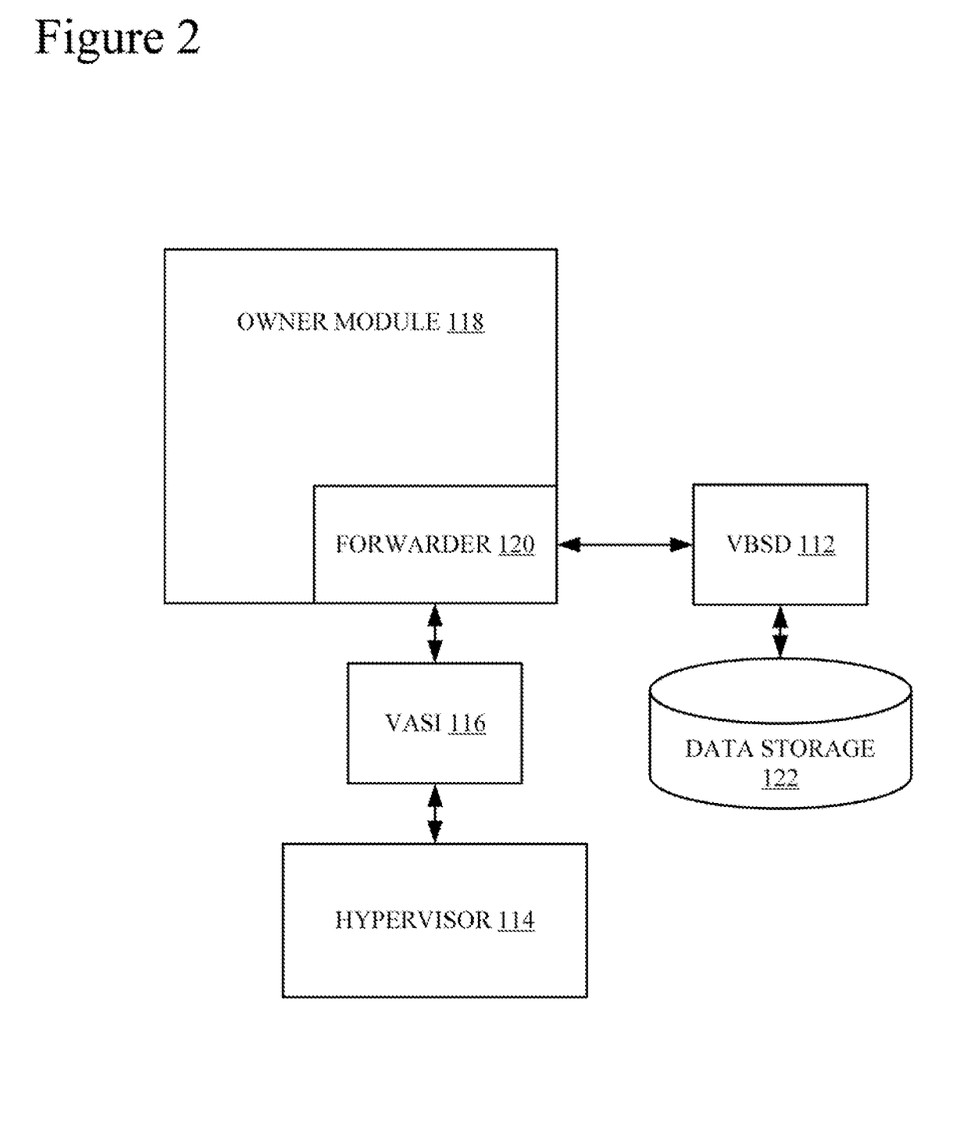
FIG. 2 is a block diagram illustrating the relationship among certain modules of FIG. 1.

FIG. 2 is a block diagram illustrating the relationship among certain modules of FIG. 1, specifically modules 110, 112, 114, 116, 118 and 120. Owner module 118 includes instantiations of Forwarder 120. As shown, Forwarder 120 handles communication between owner module 118 and both VBSD 112 and VASI 116. Owner module 118 includes any high level processing or functionality necessary for its own specifications, which may include any processing tasks executed by system 102. In other words, owner module represents a generic processing task and any such task may be configured to implement the disclosed technology. As explained above module 118 is sometimes referred to as Pager 118 because a module that handles communication between an owner module 118 and both VBSD 112 and VASI 116, or Pager, is one example of the type of functionality that may be implemented using the disclosed technology. Another example is a hibernator process, which is a computer process that, after a period of inactivity, saves CPU memory (not shown) into non-volatile storage such as data storage 122 and powers down components of the computer to save power or battery life.

Owner module 118 drives the configuration and unconfiguration of Forwarder 120 (see FIG. 4) and there is a global table of each type of owner module 118 that include a forwarder. For example, if owner module 118 executes a particular type of task, such as a pager, and another owner module executes the same type of task, there would be one global table shared by both owner modules. However, if another owner module executes another task, such as a hibernator, there is a separate global table for that particular owner module and any other owner modules executing the task.

Figure 3:
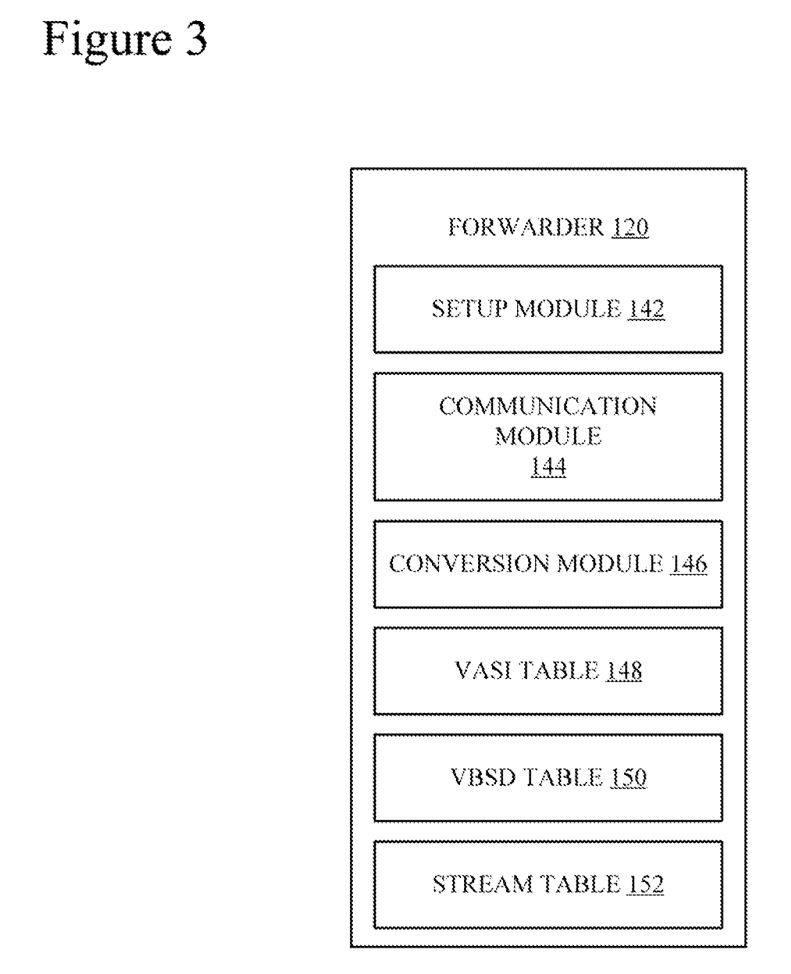
FIG. 3 is a block diagram of the Forwarder of FIGS. 1 and 2 in more detail.

FIG. 3 is a block diagram of the Forwarder 120 of FIGS. 1 and 2 in more detail. Although each extension of kernel 110 that deals with VBSD 112 (FIGS. 1 and 2) and VASI 116 (FIGS. 1 and 2) appears to be its own separate kernel extension, the portion of the kernel extension which deals with interfacing with VBSD 112 and VASI 116 are common called the Forwarder 120. Forwarder 120 includes a Setup module 142, a Communication Module 144, a Conversion module 146 and a VASI table module 148, a VBSD table 150 and a Stream Table 150.

Setup module 142 is responsible for the creation and initialization of Forwarder 120, including the creation of flight table 150. Communication module 144 handles input and output (I/O) transmitted and received from other components of computing system 102 (FIG. 1). In the example of an owner module such as owner module 118 that is configured as a Pager, Forwarder 120 transmits and receives communications from both VASI 116 (FIGS. 1 and 2) and VBSD 112 (FIGS. 1 and 2). Conversion module 146 is responsible for formatting communication from a first format corresponding to one particular component into a second format corresponding to a second component and vice versa. Of course that may be more than two types of components and corresponding formats that employ Forwarder 120 so it should be understood that any necessary format conversion are handles by Forwarder 120.

VASI table 148 stores information necessary for communication between Forwarder 120 and VASI 116. VBSD table 150 stores information necessary for communication between Forwarder 120 and VBSD 112. Stream table 152 stored information on pending requests. Information stored in Stream table 152 in conjunction with a Pager include, but is not limited to, pointers to the corresponding request, a parsed buffer and a pointer to a scatter gather list. The uses of modules 142, 144, 146, 148, 150 and 152 are described in more detail below in conjunction with FIGS. 4-6.

Figure 4:
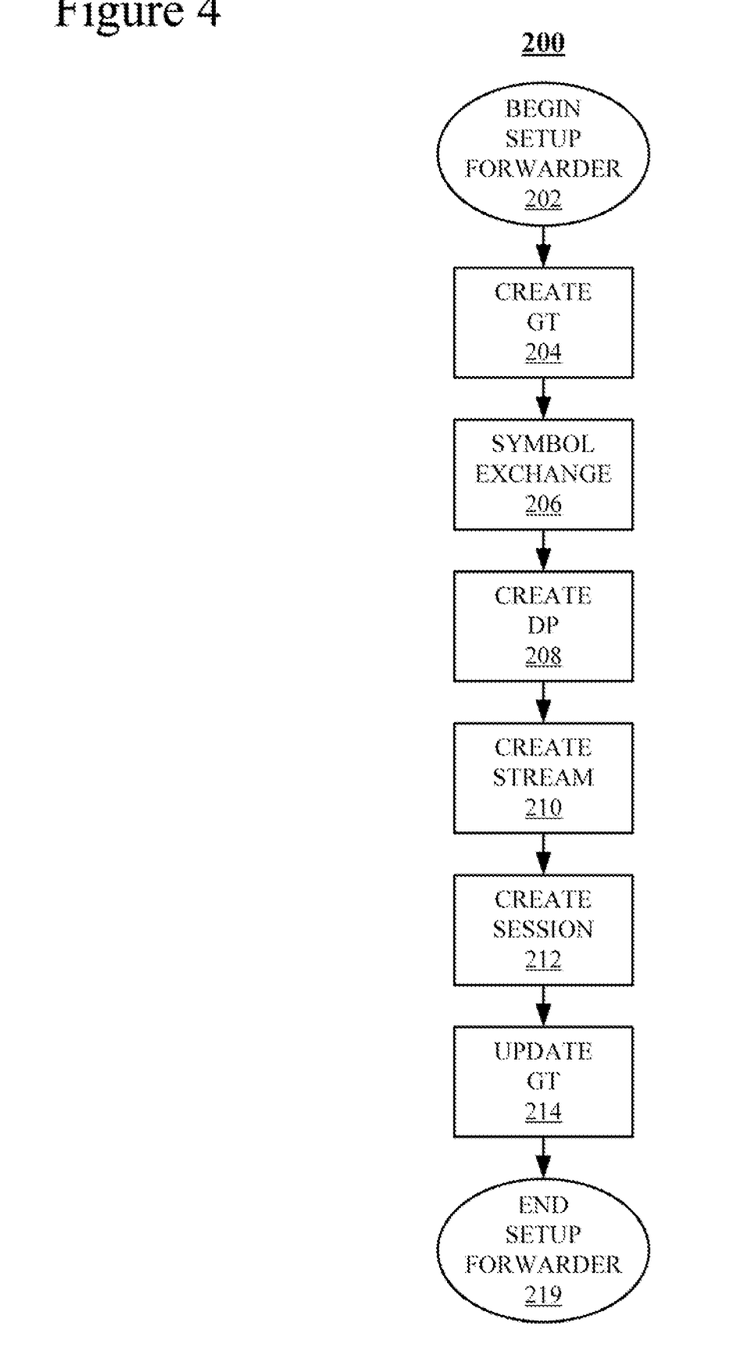
FIG. 4 is a flowchart of a Setup Forwarder process.

FIG. 4 is a flowchart of a Setup Forwarder process 200. In this example, process 200 is executed by owner module 118 (FIGS. 1 and 2) of computing system 102 and executed to create and initialize Forwarder 120 (FIGS. 1-3). In other words, process 200 is executed to create Forwarder 120 for owner-specific module 118, which in this example is an I/O paging module or "Pager." It should be understood, that owner module 118 drives the creation, configuration and unconfiguration of Forwarder 120 and there is a global table of each type of owner module 118 that include a forwarder. For example, if owner module 118 executes a particular type of task, such as a pager, and another owner module executes the same type of task, there would be one global table shared by both owner modules. However, if another owner module executes another task, such as a hibernator, there is a separate global table for that particular owner module and any other owner modules executing the task.

Process 200 starts in a "Begin Setup Forwarder (FOR.)" block 202 and proceeds immediately to a "Create Global Table (GT)" block 204. During block 204, process 200 creates a global forwarder table. As explained above in conjunction with FIG. 3, there is one global table for each type of owner module, e.g. multiple modules that handle memory paging tasks share a single global table. Once a global table is established for a particular type of task, the global table does not need to be created again. During block 204 the fields of the global table are also initialized with all pertinent data fields such as, but not limited to, the number of forwarder instances, a list of streams and any function pointers needed for communication. The first time through process 200 many of these variables are set to a value of '0' and are updated later.

During a "Symbol Exchange" block 206, process 200 communicates with VBSD 112 to retrieve function pointers necessary to initiate communication. These symbols are exchanged and stored in the global table. Symbol exchange and storage occurs the first time process 200 is initiated with respect to a particular type of owner module 118 and the stored symbols remain valid for the life of Forwarder 112. During a "Create Destroy Process (DP)" block 208, a destroy process (not shown) is started, initialized and put to sleep. The destroy process is created to monitor and drive deletion of both streams and process 200 itself. The destroy process is initialized with variables such as, but not limited to, global event anchors. Once put to sleep, the destroy process is awakened on two occasions: 1) a stream is unconfigured; and 2) process 200 is being unconfigured. When a stream is unconfigured, the destroy process drives the deletion process, including clean up of any relevant tables and other memory and notification of other processes. When process 200 is unconfigured, the destroy process closes open streams, deallocates memory for streams and sessions, notifies other processes and then terminates itself.

During a "Create Stream" block 210, process 200 establishes the communication paths necessary for communication with VASI 116 and VBSD 112. The creation of a stream is described in more detail below in conjunction with FIG. 5. During a "Create Session" block 210, process 200 queries VASI 116 (FIG. 1) to determine required parameters to drive traffic between VASI 116 and Forwarder 120. Forwarder 120 then requests a session with VBSD 112 using the parameters received from VASI 116. During an "Update Global Table" block 212, the global table created during block 204 is updated to reflect the addition of the new session.

Figure 5:
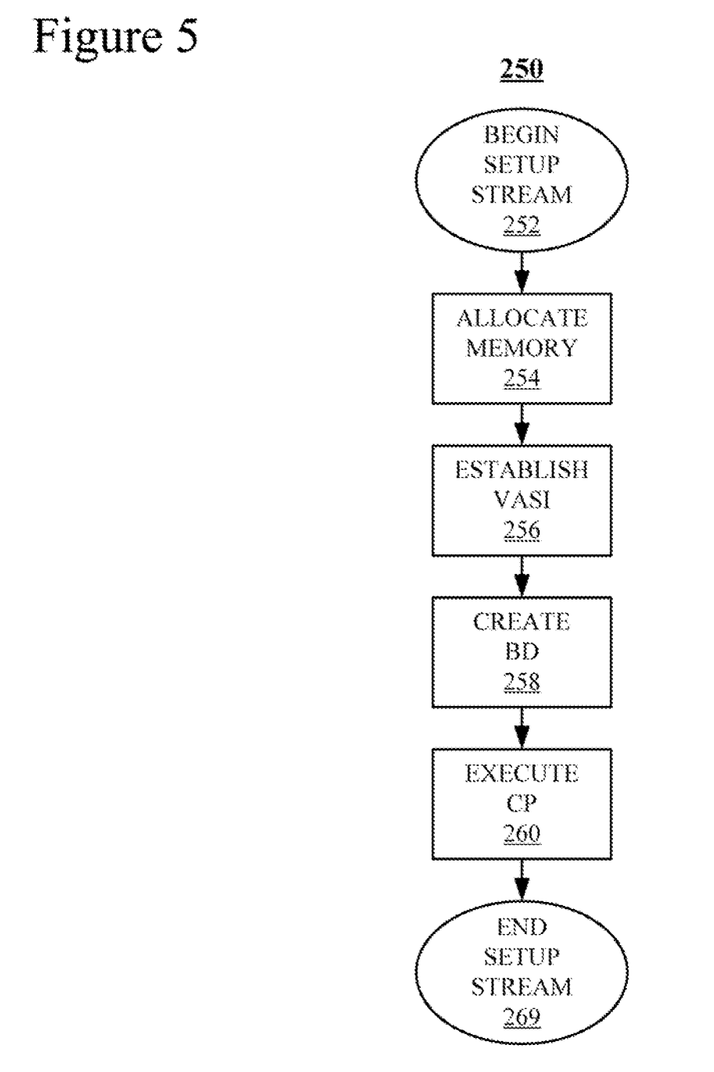
FIG. 5 is a flowchart of a Setup Stream process that implements a portion of the Setup Forwarder process of FIG. 4.

FIG. 5 is a flowchart of a "Setup Stream" process 250 (see process block 210, FIG. 4). Process 250 starts in a "Begin Setup Stream" block 252 and proceeds immediately to an "Allocate Memory" block 254. During block 254, process 250 allocates memory necessary for the stream. During an "Establish VASI" block 256, process 250 drives the exchange of information necessary for the setup and initialization of VASI 116 (FIGS. 1 and 2). After successful initiation of VASI 116 communication, control proceeds to a "Create Block Device (BD)" block 258. During block 258, Forwarder 120 requests from VBSD 112 (FIGS. 1 and 2) the creation of a block memory device. Based upon the parameters exchanged during block 256.

During an "Execute Central Process (CP)" block 260, Forwarder 120 initiates a Central Process 300 (see FIG. 6) that spawns all threads necessary for operation of the stream. Process 300 executes throughout the lifetime of the stream. Finally, process 250 proceeds to an "End Setup Stream" block 269 in which process 250 is complete.

Figure 6:
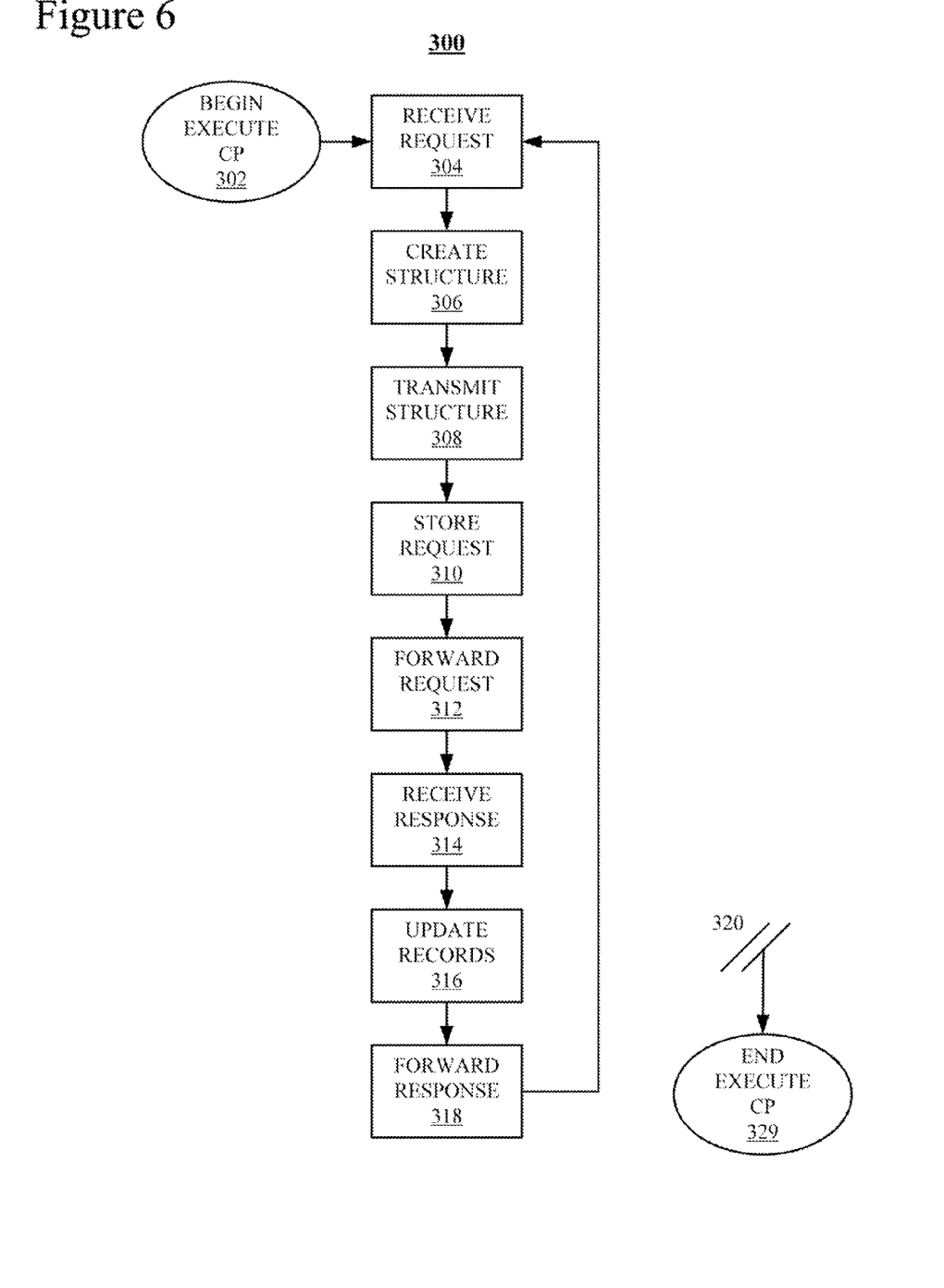
FIG. 6 is a flowchart of an Execute Central Process (CP) process.

FIG. 6 is a flowchart of a "Setup Central Process (CP)" process 300. In this example, process 300 is stored on data storage 122 (FIG. 1) and executes on a processor (not shown) associated with computing system 1 102 (FIG. 1).

Process 300 starts in a "Begin Execute Central Process (CP)" block 302 and proceeds immediately to a "Receive Request" block 304. During block 304, hypervisor 114 (FIGS. 1 and 2) drives an I/O request that is received by VASI 116 (FIGS. 1 and 2). During a "Create Structure" block 306, VASI 116 formats the request in the form of a parsed buffer, formatted in a structure specific to VASI 116, and a scatter gather list. The parsed buffer information includes data such as, but not necessarily limited to, the size of the I/O request, a correlator parameter for tracking the request, and a pointer to the parsed list of scatter gather entries. Each entry in the scatter gather list provides information for a single I/O operation and includes, but is not limited to, a base address, an offset from the base address, a number of bytes of the entry and whether the corresponding request is a read or write operation.

During a "Transmit Structure" block 308, process 300 transmits the buffer created during block 306 to Forwarder 120. During a "Store Request" block 310, Forwarder 120 stored the request in a list of outstanding requests, used to verify incoming responses (see process block 314). Information stored in conjunction with an incoming request includes, but is not limited to, times the request was received and responded to and a parsed buffer and a pointer to a scatter gather list. During a "Forward Request" block 312, process 300 forwards the request to VBSD 112 (FIGS. 1 and 2).

Once a request has been forwarded to VBSD 112 during block 312, process 300 waits for a reply from VBSD 112 during a "Receive Response" block 314. A response received during block 314 from VBSD 112 includes a pointer to the parsed buffer created during block 310 that correspond to the original request. Once a response is received, process 300 proceeds to an "Update Records" block 316, during which Forwarder 120 removes the corresponding entry from the list of outstanding requests stored during block 310. During a "Forward Response" block 318, the response received during block 314 is forwarded to VASI 116. Control then returns to Receive Request block 304 in which Forwarder 120 waits for the next communication request and processing proceeds as explained above.

Finally, process 300 is halted by means of an interrupt 320, which passes control to an "End Execute CP" block 319 in which process 300 is complete. Interrupt 318 is typically generated when system 102 or owner module 118 of which process 300 is a part is itself halted. During nominal operation, process 300 continuously loops through blocks 304, 306, 308, 310, 312, 314, 316 and 318, processing I/O request generated by hypervisor 114.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method for handling a request from a hypervisor in a computing system, comprising:
   receiving, at a virtual asynchronous services interface (VAST) from a hypervisor, a request directed to a service provider device;
   converting the request to a command data-link interface (CDLI) format;
   transmitting the CDLI formatted request to an operation-specific module;
   converting, by the operation-specific module, the CDLI formatted request to a command format corresponding to the service provider device;
   transmitting, by the operation-specific module, the service provider device formatted request to the service provider device;
   receiving a response from the service provider device at the operation-specific module;
   converting, by the operation-specific module, the response from the service provider device to the CDLI format;
   transmitting, by the operation-specific module, the CDLI formatted response to the VASI;
   converting the CDLI formatted response to a format corresponding to the hypervisor; and
   transmitting the hypervisor formatted response to the hypervisor.

2. The method of claim 1, wherein the operation-specific device is a paging device and the service provider device is a virtual block storage device (VBSD).

3. The method of claim 1, wherein the operation-specific device is a hibernation module.

4. The method of claim 1, wherein the request is a Read/Write (R/W) operation.

5. The method of claim 1, further comprising processing the CDLI formatted request received at the operation-specific module based upon a content type of the CDLI formatted request.

6. The method of claim 5, wherein the content type is a paging Input/Output (I/O) request.

7. The method of claim 6, the processing comprising:
   a caching process;
   a read-ahead process; and
   an I/O coalescing process.

8. The method of claim 1, wherein the operation-specific device module is a power management device.

9. A system for handling a request from a hypervisor in a computing system, comprising:
   a processor;
   a hypervisor;
   a virtual asynchronous services interface (VASI);
   an operation-specific module;
   logic, executed on the processor, for converting a request received by the VAST from the hypervisor to a command data-link interface (CDLI) format for transmission to the operation-specific module;
   logic, executed on the processor, for converting the CDLI formatted request to a command format corresponding to a service provider device for transmission to the service provider device;
   logic, executed on the processor, for converting a response from the service provider device to the CDLI format for transmission from the service provider device to the VASI; and
   logic, executed on the processor, for converting the CDLI formatted response to a format corresponding to the hypervisor for transmission to the hypervisor.

10. The system of claim 9, wherein the operation-specific device is a paging device and the service provider device is a virtual block storage device (VBSD).

11. The system of claim 9, wherein the operation-specific device is a hibernation module.

12. The system of claim 9, wherein the request is a Read/Write (R/W) operation.

13. The system of claim 9, further comprising logic, executed on the processor, for processing the CDLI formatted request received at the operation-specific module based upon a content type of the CDLI formatted request.

14. The system of claim 13, wherein the content type is a paging Input/Output (I/O) request.

15. The system of claim 14, the logic for processing comprising:
   a caching process;
   a read-ahead process; and
   an I/O coalescing process.

16. The system of claim 9, wherein the operation-specific module is a power management device.

17. A computer programming product for handling a request from a hypervisor in a computing system, comprising:
- a physical memory;
- logic, stored on the physical memory for execution on a processor, for:
    - receiving, at a virtual asynchronous services interface (VASI) from a hypervisor, a request directed to a service provider device;
    - converting the request to a command data-link interface (CDLI) format;
    - transmitting the CDLI formatted request to an operation-specific module;
- logic, stored on the physical memory for execution on a processor, for converting the CDLI formatted request to a command format corresponding to the service provider device;
    - transmitting the service provider device formatted request to the service provider device;
    - receiving a response from the service provider device at the operation-specific module;
    - converting the response from the service provider device to the CDLI format;
    - transmitting the CDLI formatted response to the VASI;
    - converting the CDLI formatted response to a format corresponding to the hypervisor; and
    - transmitting the hypervisor formatted response to the hypervisor.

18. The computer programming product of claim 17, wherein the operation-specific device is a paging device and the service provider device is a virtual block storage device (VBSD).

19. The computer programming product of claim 17, wherein the request is a Read/Write (R/W) operation.

20. The computer programming product of claim 17, further comprising logic for processing the CDLI formatted request received at the operation-specific module based upon a content type of the CDLI formatted request.

21. The computer programming product of claim 20, wherein the content type is a paging Input/Output (I/O) request.

22. The computer programming product of claim 21, the logic for processing comprising:
- a caching process;
- a read-ahead process; and
- an I/O coalescing process.

23. The computer programming product of claim 17, wherein the operation-specific device module is a power management device.

* * * * *